(12) United States Patent
Malmin et al.

(10) Patent No.: US 10,330,797 B2
(45) Date of Patent: Jun. 25, 2019

(54) METHOD FOR DEAD TIME DETERMINATION IN A GAMMA CAMERA AND A SYSTEM FOR ACCOMPLISHING THE SAME (71) Applicant: Siemens Medical Solutions USA, Inc., Malvern, PA (US)

(72) Inventors: Ronald Malmin, Chicago, IL (US); James Frank Caruba, Bartlett, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 15/316,141

(22) PCT Filed: Jun. 23, 2015

(86) PCT No.: PCT/IB2015/054677
§ 371 (c)(1),
(2) Date: Dec. 2, 2016

(87) PCT Pub. No.: WO2015/198207
PCT Pub. Date: Dec. 30, 2015

(65) Prior Publication Data
US 2017/0115404 A1    Apr. 27, 2017

Related U.S. Application Data

(60) Provisional application No. 62/015,567, filed on Jun. 23, 2014, provisional application No. 62/130,677, filed on Mar. 10, 2015.

(51) Int. Cl.
*G01T 1/17* (2006.01)
*G01T 1/208* (2006.01)

(52) U.S. Cl.
CPC .............. *G01T 1/171* (2013.01); *G01T 1/208* (2013.01)

(58) Field of Classification Search
CPC .................................. G01T 1/208; G01T 1/171
See application file for complete search history.

(56) References Cited

U.S. PATENT DOCUMENTS 4,058,728 A    11/1977 Nickles
4,369,495 A    1/1983 Inbar et al.
(Continued)

FOREIGN PATENT DOCUMENTS

CN    1758037 A    4/2006
CN    101680954 A    3/2010
(Continued)

OTHER PUBLICATIONS

Gupta (Mathematical modeling of radiation, Chapter, Radiation ,ionization and detection in nuclear medicine, Springer link, pp. 135-185, Dec. 2012).*
(Continued)

*Primary Examiner* — David P Porta
*Assistant Examiner* — Djura Malevic (57) ABSTRACT

Disclosed herein is a method for estimating count loss in a gamma camera comprising injecting a synthetic pulse at a given rate into a data stream emanating from a photo detector; integrating the synthetic pulse into the data stream to form an integrated data stream; determining a number of synthetic pulses from the data stream that pass onto a final image; and determining the count loss from the Equation (2)

$$\text{Percent Count Loss} = \frac{\left(\frac{\text{Number of pulses introduced}-}{\text{Number of pulses detected}}\right) \times 100}{\text{Number of pulses introduced}}. \quad (2)$$

19 Claims, 3 Drawing Sheets (56) References Cited

U.S. PATENT DOCUMENTS 4,968,889 A    11/1990   Hartwell et al.
2011/0144945 A1   6/2011   Hayashi et al.

FOREIGN PATENT DOCUMENTS

HU    P0800770    7/2010
HU    P0900574    12/2010

OTHER PUBLICATIONS

Cardoso, J M et al., "Optimization of digital spectrometers using a pulse streaming generator", 2004 IEEE Nuclear Science Symposium Conference Record Oct. 16-22, 2004 Rome, Italy, IEEE, Piscataway, NJ, USA, vol. 3, Oct. 16, 2004, pp. 1391-1395.
International PCT Search Report and Written Opinion dated Oct. 14, 2015 (12 pages).
Search Report for Corresponding Hungarian Patent Application No. P1700022, dated Mar. 30, 2017.
Office Action received for corresponding Chinese Application No. 201580033743.1 dated Jun. 21, 2018, with translation.

* cited by examiner

METHOD FOR DEAD TIME DETERMINATION IN A GAMMA CAMERA AND A SYSTEM FOR ACCOMPLISHING THE SAME

CROSS-REFERENCE TO RELATED APPLICATIONS

This disclosure claims the benefit of U.S. Provisional Patent No. 62/130,677 filed on Mar. 10, 2015 and of U.S. Provisional Patent No. 62/015,567 filed on Jun. 23, 2014, the entire contents of both applications being hereby incorporated by reference.

BACKGROUND

This disclosure relates to a method for determining the dead time in a gamma camera and to a system for accomplishing the same.

The dead time (also called a count loss) of a nuclear imaging system is the time during which the system processes a one or more events (i.e., the interaction of a particle or stimulus from a radiation field with the system) and is not available to process succeeding events. It arises because of the multitude of electronic circuits in a nuclear imaging system, each with its own dead time, and the complex interaction between such circuits. Furthermore, the count rate losses of a system are a function of the total number of particles produced by the radiation field under investigation, including those which lie outside the energy window of the single channel analyzer of the system, because the interactions of such particles occupy the circuitry of the system while a decision is being reached with regard to further processing. Thus, the dead time of a nuclear imaging system depends on the nature of the system and the type of field interacting therewith.

As a consequence of the dead time phenomenon in nuclear imaging systems, the rate at which events are processed by the system is a non-linear function of the rate of incoming events. For a gamma camera, the curve relating events processed to incoming events eventually reaches a maximum and this maximum defines a fold-back point of the curve. At the fold-back point, the camera will process only about 50% of the incoming events; while at greater counting rates, the efficiency of the camera drops below 50%. Thus, if a radiation field produces particles that interact with the camera at rates in excess of those at the fold-back point, less than half of these events will be processed by the camera and appear in a map of the radiation field.

One approach to compensating for the dead time of a gamma camera (in order to take into account the dependency of the efficiency of the camera on the rate of incoming events) is to empirically measure the true rate as a function of apparent rate for a system that approximates a clinical system and storing that information in a look-up table (LUT). The front-end count rate for future patients is then estimated by using the look-up table (LUT). Since this method is time-variant or case-variant it reduces the accuracy of the count loss correction.

As indicated previously, dead time is extremely complicated and is dependent not only on the inherent limitations of the camera itself but on the nuclear spectra with which the camera is interacting. As a consequence, the use of an empirical function to compensate for dead time is fraught with error.

It is therefore desirable to accurately estimate the dead time of the gamma camera. It is also desirable to be able to correct for efficiency which decreases with increasing count rate due to deadtime in the detector. Doing so permits the creation of functional images that are quantitative; where the numbers in the images represent, for instance, the absolute amount of radioactive tracer that has been taken up by the tissue—e.g., in megaBecquerels per cubic centimeters (MBq/cc). In order to do so the system has to be accurately calibrated for its sensitivity to activity.

It is therefore desirable to provide a new and improved method of and means for compensating for the dead time of a gamma camera which is less complex than previously used techniques and that is more likely to produce accurate results.

SUMMARY

Disclosed herein is a method for estimating count loss in a gamma camera comprising injecting a synthetic pulse at a given rate into a data stream emanating from a photo detector; integrating the synthetic pulse into the data stream to form an integrated data stream; determining a number of synthetic pulses from the data stream that pass on to a final image; and determining the count loss from the Equation (2)

$$\text{Percent Count Loss} = \frac{\left(\text{Number of pulses introduced} - \text{Number of pulses detected}\right) \times 100}{\text{Number of pulses introduced}}. \quad (2)$$

Disclosed herein is a system comprising a scintillation crystal; a photo detector that is operative to generate a data stream based on photons received from the scintillation crystal; an amplifier that is operative to amplify voltages based on the data stream received from the photo detector; an analog to digital converter that is operative to convert the data stream to a digital data stream; an integrator; and a pulser; where the pulser is operative to introduce a synthetic pulse into the data stream generated by the photo detector; and wherein the integrator is operative to integrate the data stream generated by the detected and the synthetic pulses generated by the pulser; where the system is operative to inject the synthetic pulses at a given rate into the data stream emanating from the photo detector; integrate the synthetic pulses into the data stream to form an integrated data stream; determine a number of synthetic pulses in the integrated data stream which pass on to a final image; and determine the count loss from the Equation (2)

$$\text{Percent Count Loss} = \frac{\left(\text{Number of pulses introduced} - \text{Number of pulses detected}\right) \times 100}{\text{Number of pulses introduced}}. \quad (2)$$

DETAILED DESCRIPTION

Disclosed herein is a system and a method that estimates the dead time (also known as count loss) of a nuclear imaging system by injecting into a data stream pulsed events that resemble, in terms of amplitude and shape, pulses produced by the system in response to interaction of stimuli from a radiation field. The injected pulses may be introduced in an analog format via an analog pulser prior to an analog to digital conversion of the pulse, or alternatively, may be digitally introduced via a digital pulser that is in electrical communication with the system downstream of an analog to digital converter. The injected pulses are counted using one or more windows (spatial windows and/or energy windows) to determine system count loss. These injected pulses are synthetic pulses and are introduced via a pulser. They are also sometimes referred to as pseudo pulses. In an embodiment, both analog and digital pulses may be simultaneously or sequentially injected into the data stream emanating from the photomultiplier tube to determine count loss.

The method comprises introducing (referred to hereinafter as "injecting") pulsed events at a predetermined rate into a data stream emanating from a detector (e.g., a photomultiplier) and counting these events after digitizing the data stream to determine the amount of count loss or the amount of dead time. The injected pulses are of a shape that is identical or substantially identical to a normal gamma event pulse. The injected pulses injected at a controlled rate (and are of a selected amplitude) to place them in a region of low counts in the spectrum of an isotope of interest. The use of a selected amplitude facilitates detection using an energy window. The difference between the number of injected pulses and the number of pulses measured at the final image provides an estimate of the dead time or count loss. One or more windows may be used to identify and to determine the number of injected pulses. For example, if 100,000 pulses are injected and only 90,000 pulses are measured after digitization of the data stream, then the count loss or dead time is estimated to be 10%. This information may be used to facilitate the creation of functional images that are quantitative; where the number of counts in the image represents for instance, the absolute amount of radioactive tracer that has been taken up by the tissue of a patient being examined.

This system of injecting pulsed events into the data stream is advantageous in that it measures count losses in the entire imaging chain that includes the front end electronics, pulse processing, position calculation, event stream formation, and transfer to external computer. Because the pulses are "typical" and identical or substantially identical in shape to normal gamma pulses, they encounter the same sources of loss throughout the entire acquisition chain. The use of triple windowing (windows involving spatial location (x and y location) and energy intensity (E)) ensures a clean pulser peak in the final image (though an actual image need not necessarily be formed). The ratio of the collected events in the pulser windows to the number of generated pulses is a direct measure of the fractional live-time, or alternatively, of the dead time. This method of estimating dead time does not depend on the state of the camera, e.g., how many windows are defined or the ratio of windowed rate to total front-end detector rate, and so on. It also does not use a tedious calibration of multiple deadtime look-up tables (LUTs), each of which may depend on isotope energy window(s), and object. This method is therefore inherently more accurate than the LUT-based approach.

Figure 1:
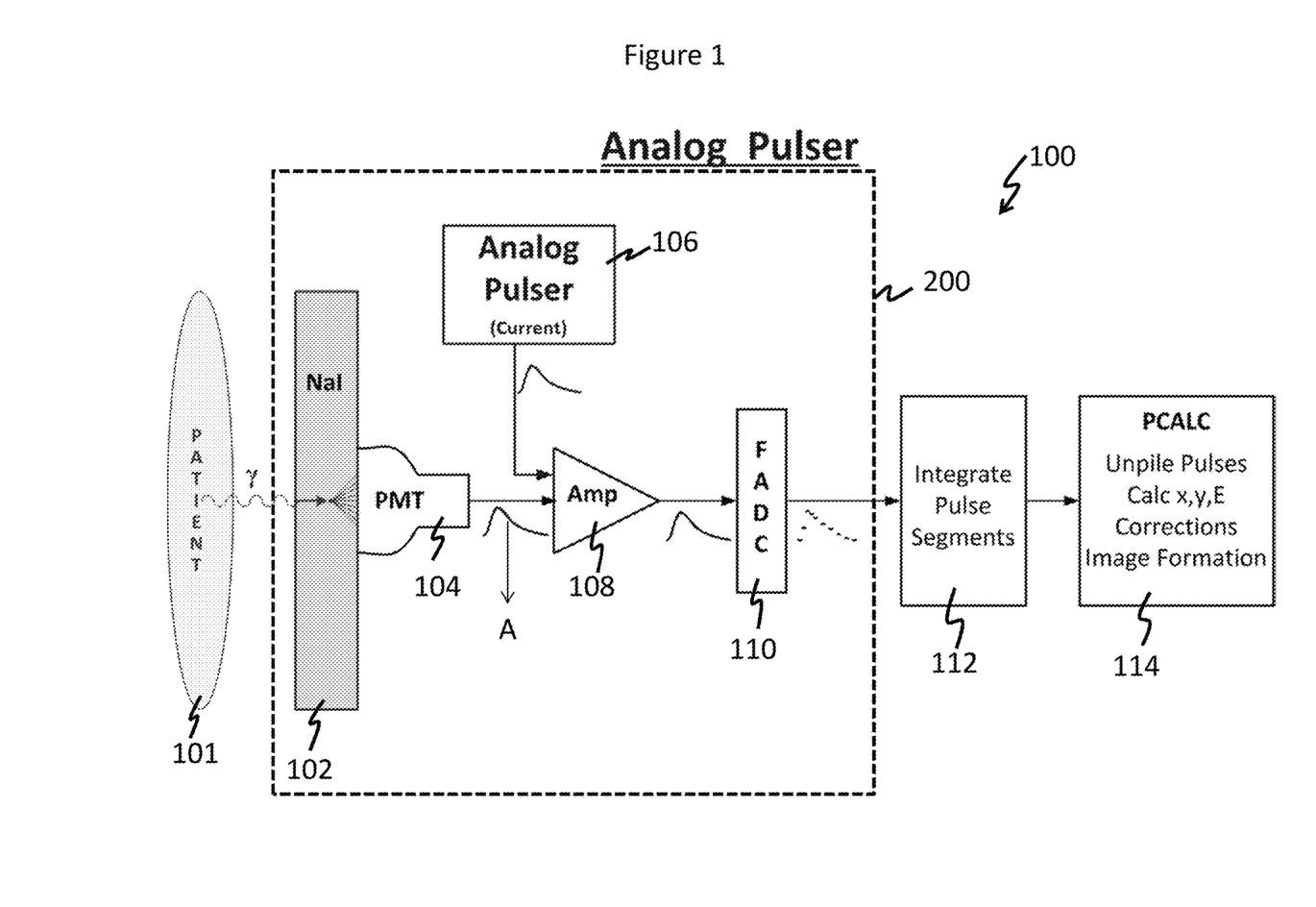
FIG. 1 is an exemplary schematic depiction of a system for the injecting of an analog pulsed event into a data stream obtained from a crystal.

FIG. 1 depicts a schematic of an exemplary system 100 for the injecting of an analog pulsed event into a data stream obtained from an object 101 (e.g., a patient) via one or more photomultiplier tubes 104. The system 100 comprises a gamma camera head 200 that includes a scintillation crystal 102, photo detectors 104 (hereinafter photomultiplier tube(s) 104), amplifiers 108, an analog pulser 106 that is operative to inject a pulsed event into a data stream generated by the detector crystal 102, analog to digital converters 110 (ADC), integrators 112 (that integrates the area under the pulse to determine its energy and is equivalent to summing up the number of scintillator photons produced by the gamma ray interaction) and a computer 114 for performing the desired calculations. The photomultiplier tubes 104 are arranged in a predetermined array with respect to a scintillation crystal (not shown) with which stimuli from a radiation field will interact, thereby producing light photons in the crystal and causing the photomultiplier tubes to produce signals, the amplitudes of which are directly related to the relative distance of a gamma event from the photomultiplier tubes 104.

While the photo detectors detailed herein are referred to as photomultiplier tubes, other photo detectors in lieu of the photomultiplier tubes may also be used, such as, for example, silicon photo multipliers or a silicon drift diodes. The scintillation crystal 102 generally comprises sodium iodide. The amplifier 108 may be a pre-amplifier, preferably a trans-impedance pre-amplifier. The analog to digital converter may be a flash analog to digital converter (FADC).

In the FIG. 1, a gamma ray emanating from the object 101 impinges on the scintillation crystal 102 interacting with it and releasing a large number of scintillation photons. The scintillation radiation is collected in the plurality of photomultiplier tubes 104. Light photons produced in the scintillation crystal decay with a characteristic lifetime leading to electronic signals with distinctive shape characterized by a rapidly rising leading edge and a trailing edge with a time constant corresponding to the scintillator decay time. This is depicted by the curve A shown in the FIG. 1. During the process of data acquisition from the object 101, the analog pulser 106 introduces analog pulses at a predetermined rate and amplitude (energy) into the data stream emanating from the photomultiplier tubes. The analog pulses may be introduced at any point prior to digitization by the ADC.

The analog to digital converter 110 digitizes the data arriving from the crystal and that introduced by the analog pulser 106. The integrator 112 integrates the pulse segments received from the scintillation crystal 102 and the analog pulser 106. It integrates the area under the pulse to determine its energy. This is equivalent to summing up the number of scintillator photons produced by the gamma ray interaction. The computer 114 functions to count the number of digitized pulses. Since the pulses are introduced at a given rate, the dead time is estimated by the computer 114 by counting the number of detected pulses in a final image, subtracting these pulses from the number of introduced pulses in the final image and computing the percentage of count loss or dead time. Some additional details about the circuitry associated with the gamma camera head 200 are provided below.

The gamma camera head 200 includes electronic circuitry (not shown) which receives the signals produced by photomultipliers 104, such signals being hereinafter referred to as input signals associated with interactions of stimuli with the scintillation crystal 102. For each gamma (γ) event in the crystal 102, a distribution of scintillation light signals is supplied to the PMTs 104. The spatial distribution of the scintillation light signals is a measure of the location in the crystal of the gamma event causing such signals in the crystal.

The electronic circuitry functions to integrate the signals produced by the photomultipliers 104 and produces, for each group of input signals, a group of output signals from which the coordinates of a gamma event can be computed. These coordinates may be spatial coordinates (x-y coordinates) or energy coordinates (E-coordinates). The electronic circuitry thus processes groups of input signals and produces groups of output signals that represent an interaction of a stimulus with the camera head 200.

System 100 also includes coordinate computation circuitry (not shown) which may be analog or digital in operation for operating on the output signals produced by electronic circuitry (not shown) for calculating the coordinates of the interaction that is represented by the group of output signals applied to computation circuitry. The operation of the computational circuitry produces the x coordinate, the y coordinate and the z-coordinate (i.e., the energy (E) coordinate) of each event. The latter represents the total energy of a gamma event in the crystal and is used to associate the spatial coordinate signals, x, y with a gamma event corresponding of a particular energy. In other words, if the energy signal lies within a predetermined energy window of a single channel analyzer that is part of the coordinate computation circuitry, then a conclusion is reached that the event causing the coordinates to be generated arose from a primary radiation stimulus interacting with scintillation crystal and not from secondary radiation. In such case, the z-coordinate signal gates the coordinates x, y into an image memory that is stored in the computer 114 thereby indexing a register at an address in the image memory corresponding to the calculated coordinates. In this way, a record of the event is stored in the image memory. If the z signal lies outside the energy window of a single channel analyzer, then no record in the image memory corresponding to that energy window is made. In an embodiment, it may be desirable to define 2 adjacent windows to record not only the primary gamma ray (photo-peak energy window) but a lower energy scatter/secondary gamma in order to correct the image for the scatted radiation.

With reference now once again to the FIG. 1, in order to estimate the count loss, a series of analog pulses are injected into a data stream by an analog pulser 106 at the preamplifier 108. The FIG. 1 however, depicts a single pulse and for purposes of discussion the analysis detailed herein will refer to a single pulse. While the FIG. 1 shows the analog pulse being introduced into the pre-amplifier, it may actually be introduced into the system 100 at any point prior to the digitization of the data stream. For example with respect to the FIG. 1, the analog pulse may also be introduced upstream of the flash analog to digital converter 110 and downstream of the preamplifier 108 if desired.

The concept employed here involves an identification of the injected pulses in the final image. This may be accomplished by choosing the total energy of the injected pulse to lie in an energy window of the spectrum with few competing data events. Since this is sometime not sufficient for high accuracy, another level of isolation of the injected pulse may be conducted. This next level of isolation is to choose the pulse characteristics (which are dependent upon the type of detector) so that the injected events appear in a spatial window which is in a part of the image with very few competing data events. One possibility is in a corner of the image where the patient is unlikely to be imaged. In the case of the example (gamma camera) there is a technique which relies on the characteristic of the Anger energy-weighted centroid calculation to place the injected events beyond the field of view in which real events could possibly be placed.

The imaging field of view is defined as the region of image space occupied by gamma rays interacting in the crystal.

Figure 2:
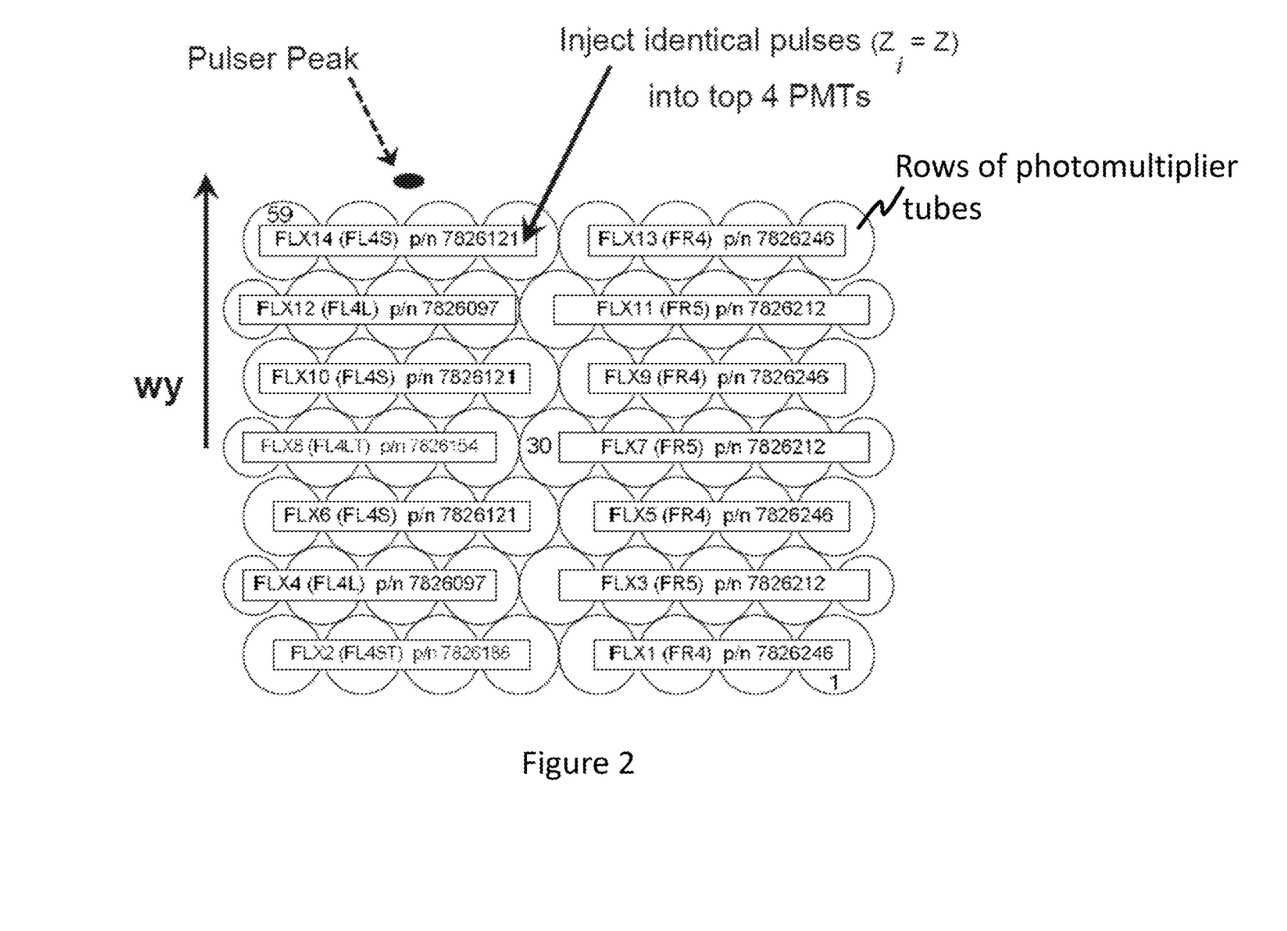
FIG. 2 is an exemplary schematic depiction of an array of photomultiplier tubes with the location of the pulsed event shown with respect to the photomultiplier tubes.

In the case of an exemplary (Anger) camera, the spatial location of the analog pulse may be determined as detailed below. Once an analog pulse is injected it will produce a sharp peak just outside of the imaging field of view (see FIG. 2). This is because the photomultiplier tube position weights for a typical gamma camera (e.g., an Anger camera) get progressively larger than the true geometrical value as the photomultiplier tube approaches the edge. Because all injected energy signals, $z_i \equiv z$, are equal the position calculation i.e., the spatial location ([x, y] position) of the pulsed event can be calculated as an energy-weighted centroid as shown in the Equations (1) below:

$$\hat{y} = \frac{\sum_{i=1}^{N} Z_i \cdot W_{y_i}}{\sum_{i=1}^{N} Z_i} \quad Z_i \equiv Z \quad W_{y_i} \equiv W_y \quad \frac{N \cdot Z \cdot W_y}{N \cdot Z} = W_y \quad \text{Eq. 1}$$

$$\hat{x} = \frac{\sum_{i=1}^{N} Z_i \cdot W_{x_i}}{\sum_{i} Z_i} \quad Z_i \equiv Z \quad , \frac{Z \cdot \sum_{i=1}^{N} W_{x_i}}{N \cdot Z} = \langle W_x \rangle$$

where $Z_i$ is the energy signal (centroid-weight) of the $i^{th}$ photomultiplier tube and $W_x$ and $W_y$ are the effective photomultiplier tube locations. The effective locations for edge photomultiplier tube are significantly larger than their geometric values. N is the number of photomultiplier tube with injected events (for example, 4 in the FIG. 2, which is discussed in detail below).

The y-location of pulsed events, therefore, should be equal to the y-weight value of the top photomultiplier tube row, which causes it to be located outside the imaged field of view of normal events. The x-location is equal to the average of the x-weight values. This is depicted in the FIG. 2 below.

The FIG. 2 is an exemplary schematic depiction of an array of photomultiplier tubes with the location of the pulser peak shown with respect to an array of photomultiplier tubes into whose respective data streams identical analog pulses have been injected as shown in the FIG. 1. As seen in FIG. 2, the exemplary gamma camera has several photomultiplier tubes placed in a two dimensional array, with the signals from the different photomultiplier tubes being combined to provide an indication of the positions and energies of detected gamma rays. In the FIG. 2, in an exemplary embodiment, 4 identical pulses are injected into the data streams of the 4 top photomultiplier tubes. The identical pulses are then processed to generate a pulser peak. As depicted in the FIG. 2, the pulser peak having the aforementioned x and y coordinates is located outside the imaging field of view of normal events. The total effective energy of the pulser peak can be increased by injecting additional identical analog pulses into the data streams of additional photomultiplier tubes shown in the photomultiplier tube array of the FIG. 2.

During the normal acquisition of data from an object 101 such as a patient, analog pulses are injected into the photomultiplier data stream using the analog pulser 106 (see FIG. 1) at a predetermined rate as detailed above. The injected pulses are introduced at a rate such that they do not interfere with the normal acquired data. The rate of the injected pulses is low enough not to add appreciably to the deadtime, but high enough that the Poisson statistics of the number of injected events actually counted in the image is small (approximately 1 to 2%). In short, the analog pulsed events are introduced at a position and at an energy that makes them isolatable from normal data acquisition crystal events. The analog pulser peak is generally of the same shape as the crystal pulse so that pulse unpiling can function normally. It is to be noted that if the detector can perform unpiling, the pulser peak is of exactly the same shape as the crystal pulse. For detectors that do not perform unpiling, this restriction may be more relaxed.

In short, it is desirable for peaks in the pulsed and the normal crystal events to be spatially and energetically distinguishable from one another. In an embodiment, it is desirable for the pulser peak to be in a low count region in both the image and the energy spectrum and for the pulser to be capable of injecting pulses whose energy can be varied depending upon the isotope being used in a particular scan.

Following the data acquisition process, the analog to digital converter 110 digitizes the data, and the integrator 112 integrates the pulse segments received from the analog to digital converter 110. The computer 114 then unpiles those pulses whose pulse shapes overlap in time. The spatial (x, y) and energy (E) data is passed to the acquisition computer and an image is formed. It calculates the number of injected pulses that pass through to the image using one or more windows, preferably two or more windows and more preferably at least 3 windows. The windows can be spatial windows—an x-window for spatial identification of the injected pulse along the x-coordinate, a y-window for spatial identification and an energy E window for an energetic identification of the injected pulse. By knowing the number of analog pulses that were originally introduced and the number of pulses counted by combining the information received from the windows, the computer can calculate the amount of dead time of count loss.

The count loss is calculated as shown in the Equation (2) below.

$$\text{Percent Count Loss} = \frac{\left(\begin{array}{c}\text{Number of pulses introduced} - \\ \text{Number of pulses detected}\end{array}\right) \times 100}{\text{Number of pulses introduced}} \quad (2)$$

The count loss or dead time of the gamma camera head 200 may then be corrected based on the value obtained from the Equation (2).

As noted above, the pulses may be introduced in an analog format as shown in the FIG. 1, or may be injected digitally after data acquired from the scintillation crystal is digitized. The digital injection is advantageous because it is not adversely affected by temperature fluctuations that may affect the instrumentation used in data acquisition (e.g., the pre-amplifier or the analog to digital converter). In the digital injection, a digital pulse is introduced during the summation phase of the process, i.e., it is generally introduced after the data obtained from the crystal is digitized. In an embodiment, the digital pulse is generally introduced at either the integrator or further downstream of the integrator after digitization of the original data obtained from the crystal is digitized.

Figure 3:
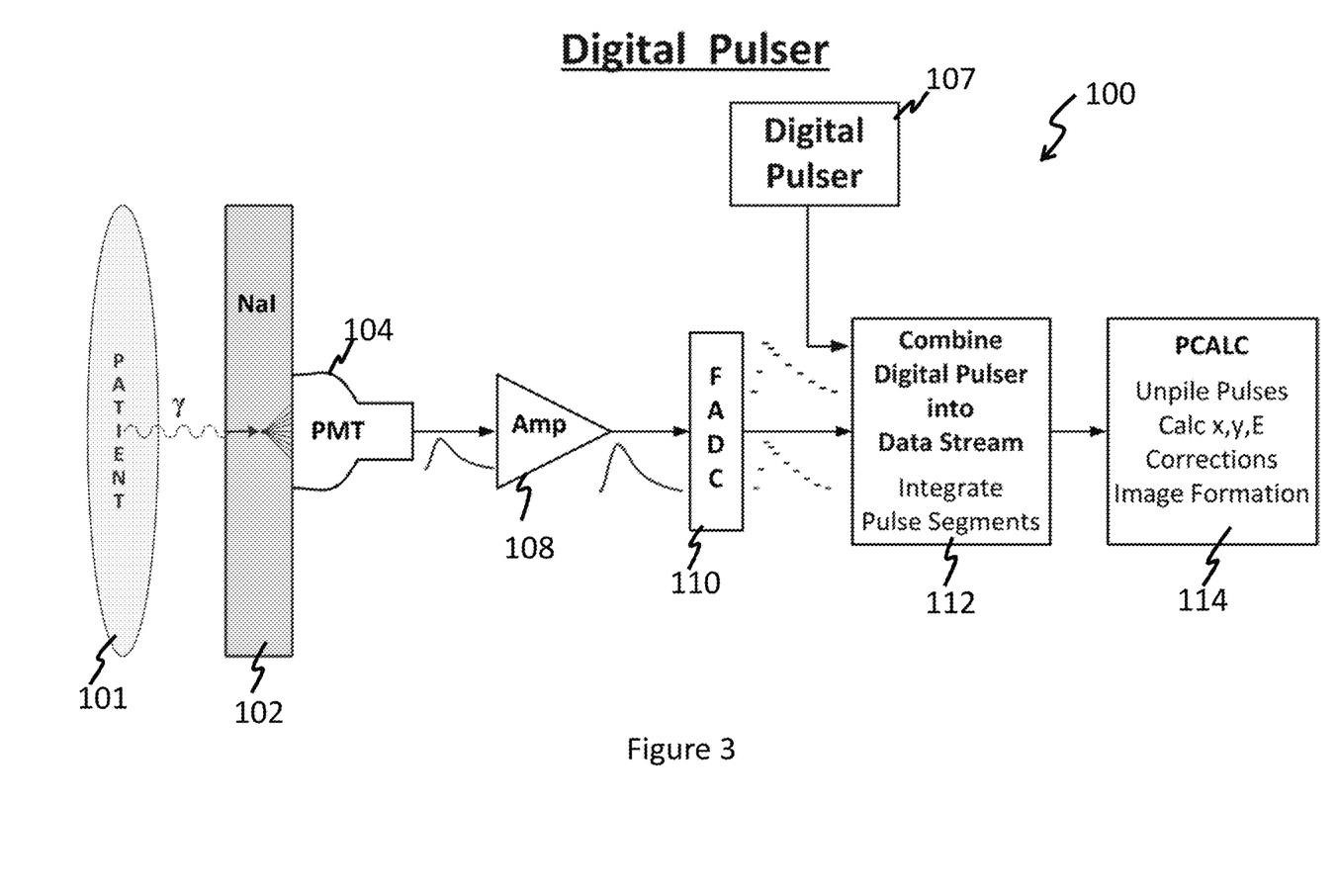
FIG. 3 is an exemplary schematic depiction of a system for the injecting of a digital pulsed event into a data stream obtained from a crystal.

The FIG. 3 is a schematic diagram that shows the digital injection of a pulse into the data stream at the integrator 112. The system 100 of the FIG. 3 is similar to the system 100 of the FIG. 1 except that it has a digital pulser 107 instead of the analog pulser 106. While the system 100 of the FIG. 3 depicts the digital pulser 107 and the system 100 of the FIG. 1 depicts the analog pulser, it is possible for a system to have both a digital pulser as well as an analog pulser and to use both either simultaneously or sequentially.

As can be seen in the FIG. 3, a digital pulse is injected via a digital pulser 107 directly into the integrator 112 that lies downstream of the analog to digital converter 110. The injected digital pulse has the same characteristics of the injected analog pulse detailed above—i.e., the injected pulse is of a shape that is identical to a normal gamma event pulse and is introduced at a controllable rate (and is of a selected amplitude) to place it in a region of low counts in the spectrum of an isotope of interest, and so on. All of these characteristics and the detection of the peak using spatial and/or energy windows will not be repeated here again in the interest of brevity.

In an embodiment, the digitally injected pulses can be scaled to be within the energy window of the isotope(s) being imaged, or alternatively, can be scaled to be outside of the energy windows of the isotope(s) being imaged. These digitally injected pulses can be either within or outside of the imaging field of view. All possible combinations of the energy windows with the imaging field of view are contemplated herein. In other words, scaling the digital gamma-event injection pulses can be conducted to place the injected pulse within the energy window of the isotope being imaged but outside the imaging field of view. Alternatively, the scaling of the digital gamma-event injection pulses can be conducted to place the digital pulse outside of the energy window(s) of the isotopes being imaged and outside the imaging field of view. In other embodiments, scaling the digital gamma-event injection pulse can be conducted to place the digital pulse within the energy window(s) of the isotopes being imaged and outside the imaging field of view of the photomultiplier tubes. In yet another embodiment, the scaling of the digital gamma-event injection pulse can be conducted to place the digital pulse outside of the energy window(s) of the isotopes being imaged and inside the imaging field of view.

The use of analog and/or digital injected pulses is useful in that the count loss can be estimated without the use of lookup tables. Temperature fluctuations of equipment do not do not affect the image location of the injected events even if they spread the injected pulser energy peak location. The disclosed system measures count losses in the entire acquisition chain. Because the pulses are "typical" and identical in shape to normal gamma pulses, they encounter the same sources of loss throughout the entire acquisition chain.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, singular forms like "a," or "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The features of the system and method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps disclosed herein may be performed automatically or wholly or partially in response to user command. An activity (including a step) performed automatically is performed in response to executable instruction or device operation without user direct initiation of the activity.

The disclosed systems and processes are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of the disclosed system. Further, any of the functions and steps provided in this disclosure may be implemented in hardware, software or a combination of both and may reside on one or more processing devices located at any location of a network linking the elements the disclosed system or another linked network, including the internet.

The term "and/or" is used herein to mean both "and" as well as "or". For example, "A and/or B" is construed to mean A, B, or A and B.

The transition term "comprising" is inclusive of the transition terms "consisting essentially of" and "consisting of" and can be interchanged for "comprising".

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method for estimating count loss in a gamma camera, the method comprising:
    injecting a synthetic pulse at a given rate into a data stream emanating from a photo-detector, the data stream representing an image captured by the gamma camera;
    isolating the synthetic pulse from data events of the data stream by choosing characteristics of the synthetic pulse that cause the synthetic pulse to appear in a spatial window beyond a field of views of the captured image, the chosen characteristics causing a peak of the synthetic pulse to be spatially and energetically distinguishable from a peak of the data stream;
    integrating the synthetic pulse into the data stream to form an integrated data stream, wherein the synthetic pulse is a digital pulse when integrated into the data stream;
    determining a number of synthetic pulses in the integrated data stream that pass into a final image; and
    determining the count loss from the Equation (2)

$$\text{Percent Count Loss} = \frac{\left(\begin{array}{c}\text{Number of pulses introduced}-\\ \text{Number of pulses detected}\end{array}\right) \times 100}{\text{Number of pulses introduced}}. \quad (2)$$

2. The method of claim 1, wherein the synthetically injected pulse is an analog pulse that is injected prior to digitization of the data stream.

3. The method of claim 2, where the analog pulse is generated by an analog pulser located upstream of an amplifier or upstream of an analog to digital converter.

4. The method of claim 1, where the synthetically injected pulse is a digital pulse that is injected after digitization of the data stream.

5. The method of claim 4, where the digital pulse is introduced via a digital pulser that is located upstream of an integrator and downstream of an analog to digital converter.

6. The method of claim 1, where the number of pulses detected are counted by one or more windows that detect pulses spatially or using an energy range.

7. The method of claim 6, where at least two windows detect pulses spatially and at least one window detects pulses using a defined energy range.

8. The method of claim 1, where the synthetically injected pulse has a substantially identical shape to a normal gamma pulse event.

9. The method of claim 1, where the synthetically injected pulse is injected in a region of low counts in a spectrum of an isotope of interest.

10. The method of claim 1, where the photo detector is a photomultiplier tube.

11. The method of claim 1, where the synthetically injected pulse is injected outside an imaging field of view.

12. The method of claim 1, where the synthetically injected pulse is injected inside an imaging field of view.

13. The method of claim 7, where a spatial location of the synthetic pulse can be calculated as using Equation (1) as follows:

$$\hat{y} = \frac{\sum_{i=1}^{N} Z_i \cdot W_{y_i}}{\sum_{i=1}^{N} Z_i} \xrightarrow{Z_i \equiv Z \ W_{y_i} \equiv W_y} \frac{N \cdot Z \cdot W_y}{N \cdot Z} = W_y \qquad \text{Eq. 1}$$

$$\hat{x} = \frac{\sum_{i=1}^{N} Z_i \cdot W_{x_i}}{\sum_i Z_i} \xrightarrow{Z_i \equiv Z} \frac{Z \cdot \sum_{i=1}^{N} W_{x_i}}{N \cdot Z} = \langle W_x \rangle$$

where $Z_i$ is the energy signal of the $i^{th}$ photo detector and $W_x$ and $W_y$ are the effective photo detector locations and wherein N is the number of photo detectors with injected events.

14. A system comprising:
a scintillation crystal;
a photo detector that is operative to generate a data stream based on photon events received from the scintillation crystal;
an amplifier that is operative to amplify voltages based on the data stream received from the photo detector;
an analog to digital converter that is operative to convert the data stream to a digital data stream;
an integrator; and
a pulser; where the pulser is operative to introduce a synthetic pulse into the data stream generated by the photo detector; and wherein the integrator is operative to integrate the data stream generated by the photo detector and the synthetic pulse generated by the pulser; where the system is operative to:
inject the synthetic pulses at a given rate into the data stream emanating from the photo detector;
isolate the synthetic pulse from the photon events by choosing characteristics of the synthetic pulse that cause the synthetic pulse to appear in a spatial window beyond a field of views of the scintillation crystal, the chosen characteristics causing a peak of the synthetic pulse to be spatially and energetically distinguishable from a peak of the data stream;
integrate the synthetic pulse into the data stream to form an integrated data stream, wherein the synthetic pulse is a digital pulse when integrated into the data stream;
determine a number of synthetic pulses in the integrated data stream which pass on to a final image; and
determine the count loss from the Equation (2)

$$\text{Percent Count Loss} = \frac{\left(\begin{array}{c}\text{Number of pulses introduced} - \\ \text{Number of pulses detected}\end{array}\right) \times 100}{\text{Number of pulses introduced}}. \qquad (2)$$

15. The system of claim 14, where the pulser is an analog pulser located upstream of the analog to digital converter.

16. The system of claim 14, where the pulser is a digital pulser located downstream of the analog to digital converter.

17. The system of claim 14, where the photo detector is a photomultiplier tube, a silicon photo multiplier or a silicon drift diode.

18. The system of claim 14, where the scintillator crystal comprises NaI.

19. The system of claim 14, where the amplifier is a trans-impedance pre-amplifier.

* * * * *

UNITED STATES PATENT AND TRADEMARK OFFICE
CERTIFICATE OF CORRECTION

PATENT NO. : 10,330,797 B2
APPLICATION NO. : 15/316141
DATED : June 25, 2019
INVENTOR(S) : Ronald Malmin and James Frank Caruba It is certified that error appears in the above-identified patent and that said Letters Patent is hereby corrected as shown below:

In the Specification

In the Detailed Description Section, Column 1, Line 20-22, "The dead time (also called a count loss) of a nuclear imaging system is the time during which the system processes a one or more events..." should read "The dead time (also called a count loss) of a nuclear imaging system is the time during which the system processes one or more events..."

In the Detailed Description Section, Column 3, Line 28-30, "The injected pulses injected at a controlled rate..." should read "The injected pulses are injected at a controlled rate..."

In the Detailed Description Section, Column 4, Line 21-23, "...other photo detectors in lieu of the photomultiplier tubes may also be used, such as, for example, silicon photo multipliers or a silicon drift diodes." should read "...other photo detectors in lieu of the photomultiplier tubes may also be used, such as, for example, silicon photo multipliers or silicon drift diodes."

In the Detailed Description Section, Column 5, Line 56, "Since this is sometime not sufficient..." should read "Since this is sometimes not sufficient..."

In the Detailed Description Section, Column 8, Line 42-43, "Temperature fluctuations of equipment do not do not affect the image location of the injected events..." should read "Temperature fluctuations of equipment do not affect the image location of the injected events..."

In the Claims

Column 11, Claim 6, Line 1, "the number of pulses are detected are counted by one or more windows that detect pulses spatially or using an energy range." should read "the number of pulses are determined are counted by one or more windows that detect pulses spatially or using an energy range."

Column 11, Claim 13, Line 20, "where Zi is the energy signal of the ith photodetector and Wx and Wy are the effective photo detector locations and wherein N is the number of photo detectors with injected Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office* events." should read "where Zi is an energy signal of an ith photodetector and Wx and Wy are each an effective photo detector location and wherein N is a number of photo detectors with injected events."

Column 12, Claim 14, Line 26, "determine the count loss from the Equation (2)..." should read "determine a count loss from the Equation (2)..."